July 10, 1928.
R. B. BENNETT
1,676,678
LEVEL WINDING FISHING REEL
Filed June 20, 1927
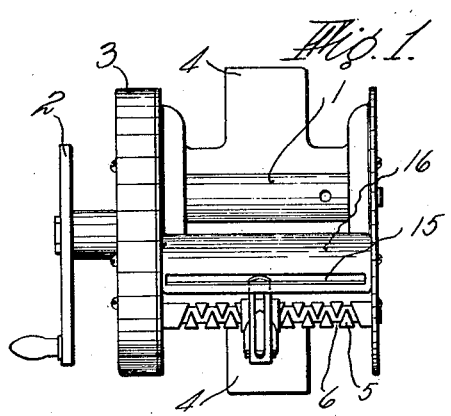
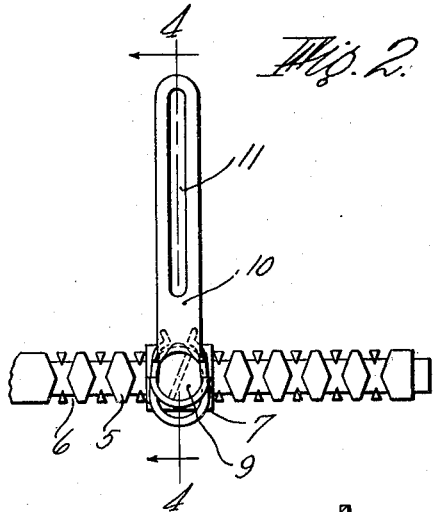
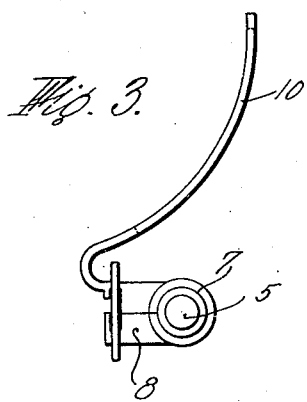
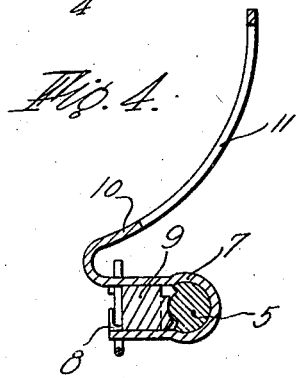
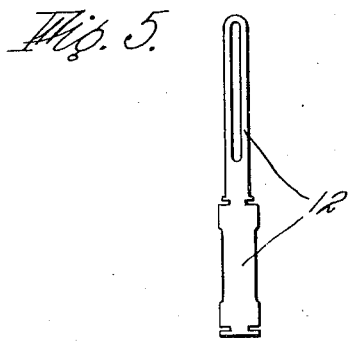
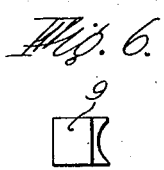
INVENTOR.
Raymond B. Bennett
BY Chapin + Neal
ATTORNEYS.

Patented July 10, 1928.

1,676,678

UNITED STATES PATENT OFFICE.

RAYMOND B. BENNETT, OF MONTAGUE CITY, MASSACHUSETTS, ASSIGNOR TO MONTAGUE CITY ROD COMPANY, OF MONTAGUE CITY, MASSACHUSETTS, A CORPORATION OF MASSACHUSETTS.

LEVEL-WINDING FISHING REEL.

Application filed June 20, 1927. Serial No. 199,994.

This invention relates to an improved level winding fishing reel. This type of reel employs in addition to the spool and its operating means a line guide mechanism. The latter is used to lay the line on the spool more evenly than it can possibly be done by hand. Broadly such mechanism is old and well known. My invention resides in an improvement in the construction of such mechanism or part, the effect of which is to modify the operation of the reel to the advantage of the user, as well as to improve the reel from a manufacturer's standpoint.

In casting, it is desirable to have the line run out freely and anything which retards such action is a disadvantage. In taking in the line, it is desirable to have it lay evenly on the spool as it is wound up, and the level winding means or line guide mechanism is, for this reason, used. Of course when the line is wound up in level turns on the spool, it is in the best condition to run out freely in casting. But due to the nature of the common level winding mechanism, the running out of the line in casting is retarded. This is due to the fact that the line as it unwinds must move the line guide back and forth from side to side on the same endless screw which was turned by the reel mechanism as the line was laid on the spool. Thus the advantage of level winding is offset to the extent that the line guide mechanism must be operated by the force of the line casting operation when a free running line is most desirable. The prior practice in making a reel in this regard has been for the most part to refine the manufacturing steps and parts along expensive lines to avoid friction, as by skilled work on expensive winding gears and reel fitting operations, to get a free running line in casting. The improved means by which I minimize this detrimental effect of the use of the line guide mechanism will be clear from the accompanying drawings and detailed description.

Fig. 1 is a top view of a complete reel of the type mentioned;

Fig. 2 is an enlarged view of parts of the level winding means;

Fig. 3 is a side view of Fig. 2;

Fig. 4 is a section on line 4—4 of Fig. 2, looking in the direction of the arrows;

Fig. 5 is a view indicating a blank or stamping from which the line guide may be bent up to the form shown in the other figures; and Fig. 6 is a view of the nut or finger to connect the line guide with its endless screw.

In accordance with the prior art the parts of my improved reel are made with a spool 1 operated by a handle 2 in the usual way by suitable gearing within the enclosed frame 3 mounted on the chair 4. This same gearing is connected to turn the endless screw shaft 5 mounted between the side plates of the frame. All of this arrangement is old and not now necessary to describe.

The prior art includes a movable bearing or sleeve mounted to slide back and forth on screw shaft 5 with a nut or finger carried in the sleeve to ride in the connected right and left-handed endless screw thread or groove 6. This endless screw when turned, causes the block to reciprocate rapidly from side to side of the frame. The sleeve carries a line guide or finger with a slot through which the fish line passes. The end of this finger usually rides in a slotted guide fixed to the frame so that the finger cannot turn with the screw, but must slide. Thus the line passing through the slot in the finger is guided in level turns on the spool as it is taken in by the fisherman. Such general operation is well known and is mentioned here only as a background for the improvement.

In prior art practice the reciprocating parts which are mounted on the endless screw have usually then made up of a machine bearing block or sleeve having a pocket to hold the nut which makes engagement with the thread, a cover for the pocket, and an extended finger having an elongated slot overlying the spool axis at right angles for carrying the line and guiding it. These reciprocating parts which must be moved by the line as cast, and particularly the bearing block, have been relatively heavy, due probably to the separate construction of the parts, and this weight has been a detriment in the operation of the reel. The rapid changes of direction necessary in the reciprocating motion of the guide multiplies the inertia effect. When the line is cast out by the fisherman, its free running force is retarded by all the inertia effect as well as the friction of the line guide mechanism moving back and forth on the endless screw.

The object of my invention is to provide a satisfactory and yet a much lighter construction for the line guide reciprocating combination. I accomplish this object by forming the bearing or sleeve 7, the recess or pocket 8 for the nut or screw engaging finger 9, and the line guide 10 with the slot 11 to overlie the axis of the spool, all from one piece of very light sheet metal bent to form from one stamping 12. The total weight of the combination of desired features can thus be reduced to such an extent that the inertia of the critical part of the reel used for casting is small enough to modify the reel action in exactly the way desired by the fisherman, in that the level winding means interferes with the casting operation very much less than in former constructions.

The blank or stamping 12 or some modification of it, as will readily be determined by a sheet metal worker, is bent by suitable dies to give the line guide structure disclosed in the other figures. The sleeve 7 is adapted to fit the endless screw shaft 5 like a split sleeve with a good fit and just loose enough to permit easy sliding on the shaft. The pocket 8 is formed from an extension of the sleeve walls 7. Since the cylindrical pocket walls are arranged in two halves, each integrally connected as an extension of sleeve 7, there is a definite spring action in these walls. I use this spring action to grasp and hold the head of the screw engaging finger 9 which is received and held in the pocket. Instead of putting a cover on the pocket, I place a light wire clip of U form which embraces the top portions of the pocket walls so that they are held squeezed together around finger 9.

From one wall of pocket 8 an integral extension 10 for the line guide is bent so as to transversely overlie the axis of spool 1 and with its outer end in the slot 15 of the frame bracing member 16. This portion 10 is of very small weight, both because it is an integral part of the thin sheet stamping and because it has its body portion formed merely for the purpose of defining the elongated slot 11. The fish line is guided by this slot 11.

In all respects, except the features of construction described by which the line guide is made exceedingly light in weight and with greater economy and convenience in the manufacturing steps, my reel may be like other reels of the level winding type. Their operation will not need to be further described.

I desire to emphasize, however, with reference to my construction, that the line guide 10 with its particular means of connecting it to the endless screw shaft 5 for the rapid reciprocating movements necessary in casting with this type of reel, will produce a minimum inertia effect to retard the fish line as it runs out. And this is important in the operation of the reel.

Having described my invention, I claim:

1. In a level winding fishing reel, level winding means comprising an endless screw shaft, a split sheet metal bearing sleeve embracing said shaft, integral extensions from said sleeve forming a pocket, a nut in said pocket for connecting the sleeve to the screw thread, a slotted line guide arranged to extend radially of said shaft and formed as an integral extension from one of said first named extensions but at an angle thereto, all constructed for a convenient manufacture of minimum weight to decrease inertia of movement on the endless screw shaft.

2. In a level winding fishing reel, level winding means comprising an endless screw shaft, a split sheet metal bearing sleeve embracing said shaft, integral extensions from said sleeve forming an open-ended pocket radially of the shaft, a slotted line guide formed as an integral addition to one of said extensions and also radially of said shaft but substantially at right angles to said pocket, a nut or finger within the walls of said pocket and extending to the endless groove of said shaft, and a wire clip embracing the pocket walls near the top to hold said nut in the pocket.

3. In a level winding fishing reel, level winding means comprising an endless screw shaft, a split sheet metal bearing sleeve of light weight embracing said shaft, said sleeve having outwardly extending integral portions from each of its free ends forming an open-ended pocket, a nut in said pocket to connect the sleeve for reciprocation as said shaft turns, a clip near the end of the pocket to hold said parts in position, and an outwardly extending line guide on said sleeve.

In testimony whereof I have affixed my signature.

RAYMOND B. BENNETT.